(12) United States Patent
Wilson et al.

(10) Patent No.: US 10,060,539 B2
(45) Date of Patent: Aug. 28, 2018

(54) PINCH VALVE FOR DISPENSING LIQUID

(71) Applicant: A.C. Dispensing Equipment Inc., Lower Sackville (CA)

(72) Inventors: Avery Wilson, Annapolis Royal (CA); Brian Gay, Enfield (CA); Derek Cole, Lower Sackville (CA); Jeffrey Tofflemire, Head of Chezzetcook (CA); Ian MacLean, Fall River (CA); Ronald Shore, Oakfield (CA)

(73) Assignee: A.C. Dispensing Equipment Inc., Lower Sackville (CA)

( * ) Notice: Subject to any disclaimer, the term of this patent is extended or adjusted under 35 U.S.C. 154(b) by 0 days.

(21) Appl. No.: 15/339,083

(22) Filed: Oct. 31, 2016

(65) Prior Publication Data

US 2017/0122450 A1    May 4, 2017

Related U.S. Application Data

(60) Provisional application No. 62/248,747, filed on Oct. 30, 2015.

(51) Int. Cl.
| | |
|---|---|
| *F16K 7/04* | (2006.01) |
| *B67D 1/00* | (2006.01) |
| *B67D 3/04* | (2006.01) |
| *B67D 1/07* | (2006.01) |

(52) U.S. Cl.
CPC ............. *F16K 7/04* (2013.01); *B67D 1/0082* (2013.01); *B67D 3/041* (2013.01); *B67D 1/07* (2013.01); *B67D 2001/0089* (2013.01); *B67D 2001/0094* (2013.01)

(58) Field of Classification Search
CPC .......... F16K 7/063; F16K 7/066; F16K 7/045; F16K 31/0602; F16K 27/0236; B67D 1/07; B67D 2001/0094; B67D 2001/0089; B67D 3/041; B67D 1/0082
USPC .............................. 251/4, 9; 222/185.1, 517
See application file for complete search history.

(56) References Cited

U.S. PATENT DOCUMENTS

| | | |
|---|---|---|
| 2,718,985 A | 9/1955 | Tamminga |
| 2,806,482 A | 9/1957 | Norris et al. |
| 3,572,407 A | 3/1971 | Clifford |
| 3,982,724 A * | 9/1976 | Citrin .................. F16K 7/06 222/43 |
| 4,807,845 A | 2/1989 | Darnell |
| 5,265,772 A | 11/1993 | Bartasevich et al. |
| 5,938,078 A | 8/1999 | Dorsey et al. |

(Continued)

OTHER PUBLICATIONS

Canadian Patent Application No. 2,946,978, Office Action dated Nov. 7, 2017.

(Continued)

*Primary Examiner* — Umashankar Venkatesan
(74) *Attorney, Agent, or Firm* — Borden Ladner Gervais LLP

(57) ABSTRACT

A pinch valve for a liquid-dispensing unit or machine has a pinch valve body to which is connected a pinch bar assembly. The pinch bar assembly has two axes of rotation and can easily be moved by a user from a pinch position, where the pinch bar is the displacement path of a plunger, to an open position where it is not in the displacement path. A liquid-dispensing tube can be installed in the pinch valve between the pinch bar and the plunger.

20 Claims, 10 Drawing Sheets

(56) References Cited

U.S. PATENT DOCUMENTS

| | | | | |
|---|---|---|---|---|
| 6,120,065 | A * | 9/2000 | Chen | F16L 37/18 |
| | | | | 285/312 |
| 7,104,275 | B2 * | 9/2006 | Dille | F16K 7/045 |
| | | | | 137/486 |
| 8,376,310 | B2 * | 2/2013 | Veltrop | F16K 7/04 |
| | | | | 251/10 |
| 8,979,070 | B2 | 3/2015 | Keizer et al. | |
| 9,638,218 | B2 * | 5/2017 | Jung | F15B 13/0424 |
| 2006/0011873 | A1 | 1/2006 | Clarke et al. | |
| 2006/0145105 | A1 | 7/2006 | Ishida et al. | |
| 2011/0095212 | A1 * | 4/2011 | Brieske | A61M 39/284 |
| | | | | 251/9 |

OTHER PUBLICATIONS

U.S. Appl. No. 15/339,038, Non-Final Office Action dated Oct. 23, 2017.
U.S. Appl. No. 15/339,205, Non-Final Office Action dated Nov. 3, 2017.
Canadian Patent Application No. 2946985, Office Action dated Jan. 11, 2018.
U.S. Appl. No. 15/339,038, Final Office Action dated May 16, 2018.

* cited by examiner

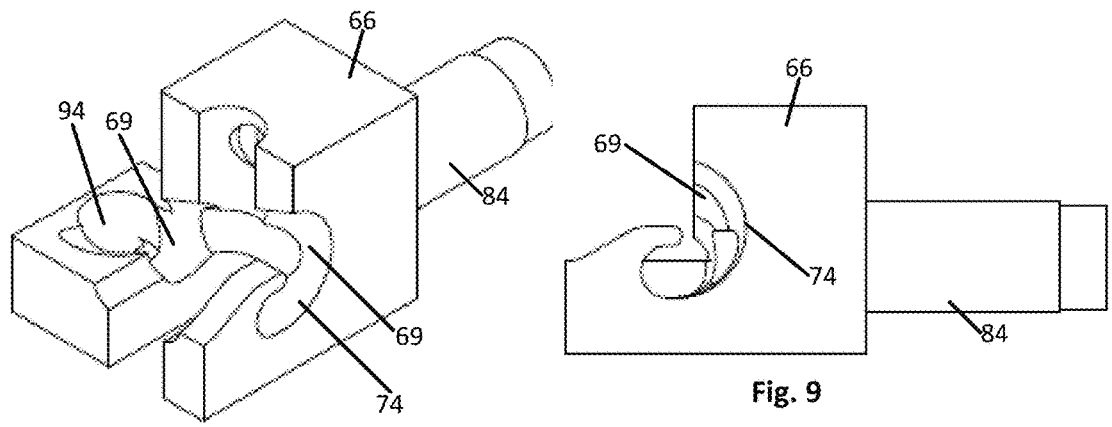
Fig. 8
Fig. 9
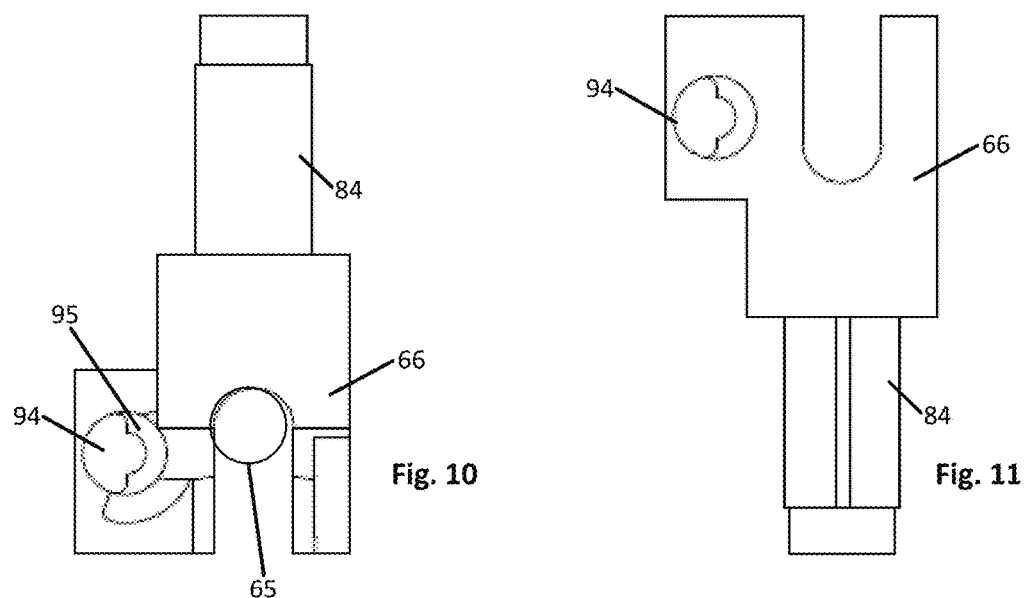
Fig. 10
Fig. 11
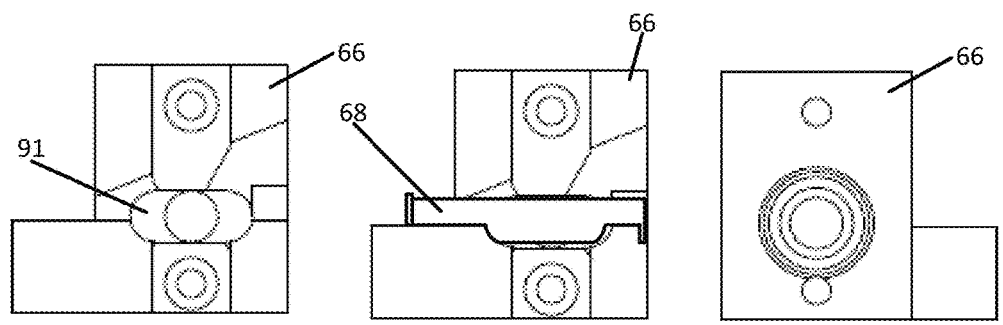
Fig. 12A
Fig. 12B
Fig. 13

PINCH VALVE FOR DISPENSING LIQUID

FIELD

The present disclosure relates generally to pinch valves. More particularly, the present disclosure relates to pinch valves used in liquid dispensers.

BACKGROUND

Cleaning existing liquid dispenser pinch valves often requires that the entire assembly of the pinch valve be taken apart, using tools to remove fasteners, prior to cleaning. This requires time, tools, training, and tracking of the fasteners so they do not get lost. As such, the liquid dispensers can experience considerable downtime, which can result, for example, in coffee shops, in customers desiring cream dispensed in their coffee, to wait longer than necessary.

Additionally, is some instances, existing pinch valves can be prone, when in their open configuration, to being damaged either by the door of the liquid dispenser to which the pinch valve is connected, or by the flexible plastic bag containing milk or cream that is loaded into the liquid dispenser.

Further, existing pinch valves do not allow easy and quick removal/insertion of dispensing tubes when removing a spent liquid container from a liquid-dispensing machine and installing a replacement liquid container.

Further, existing pinch valves often lack suitable control of the volume of liquid being dispensed.

Therefore, improvements in pinch valves are desirable.

SUMMARY

In a first aspect, the present disclosure provides a pinch valve body for mounting to liquid-dispensing unit and for cooperating with a plunger. The pinch valve body comprises a housing portion defining a displacement path for the plunger to move within the housing portion, a pinch bar, and an articulated joint having two axes of rotation. The pinch bar is secured to the housing portion through the articulated joint. The housing portion, the pinch bar and the articulated joint are configured for movement of the pinch bar between a pinch position, where the pinch bar is in the displacement path, to an open position, where the pinch bar is out of the displacement path.

In a second aspect of the present disclosure, there is provided pinch valve body for mounting to liquid-dispensing unit and for cooperating with a plunger. The pinch valve body comprises a housing portion, a pinch bar and an articulated joint having two axes of rotation. The pinch bar is secured to the housing portion through the articulated joint. The housing portion, the pinch bar and the articulated joint are configured for movement of the pinch bar between a pinch position, where the pinch bar is set to receive strikes from the plunger, to an open position.

BRIEF DESCRIPTION OF THE DRAWINGS

Embodiments of the present disclosure will now be described, by way of example only, with reference to the attached Figures.

FIG. 8 shows a front view of the housing portion of FIG. 8.

FIG. 9 shows a side elevation view of the housing portion of FIG. 8.

FIG. 10 shows a top view of the housing portion of FIG. 8.

FIG. 11 shows a bottom view of the housing portion of FIG. 8.

FIG. 12A shows a bottom view of the housing portion of FIG. 8.

FIG. 12B shows a front view of the housing portion with the pinch bar installed.

FIG. 13 shows a back view of the housing portion of FIG. 8.

DETAILED DESCRIPTION

Figure 1:
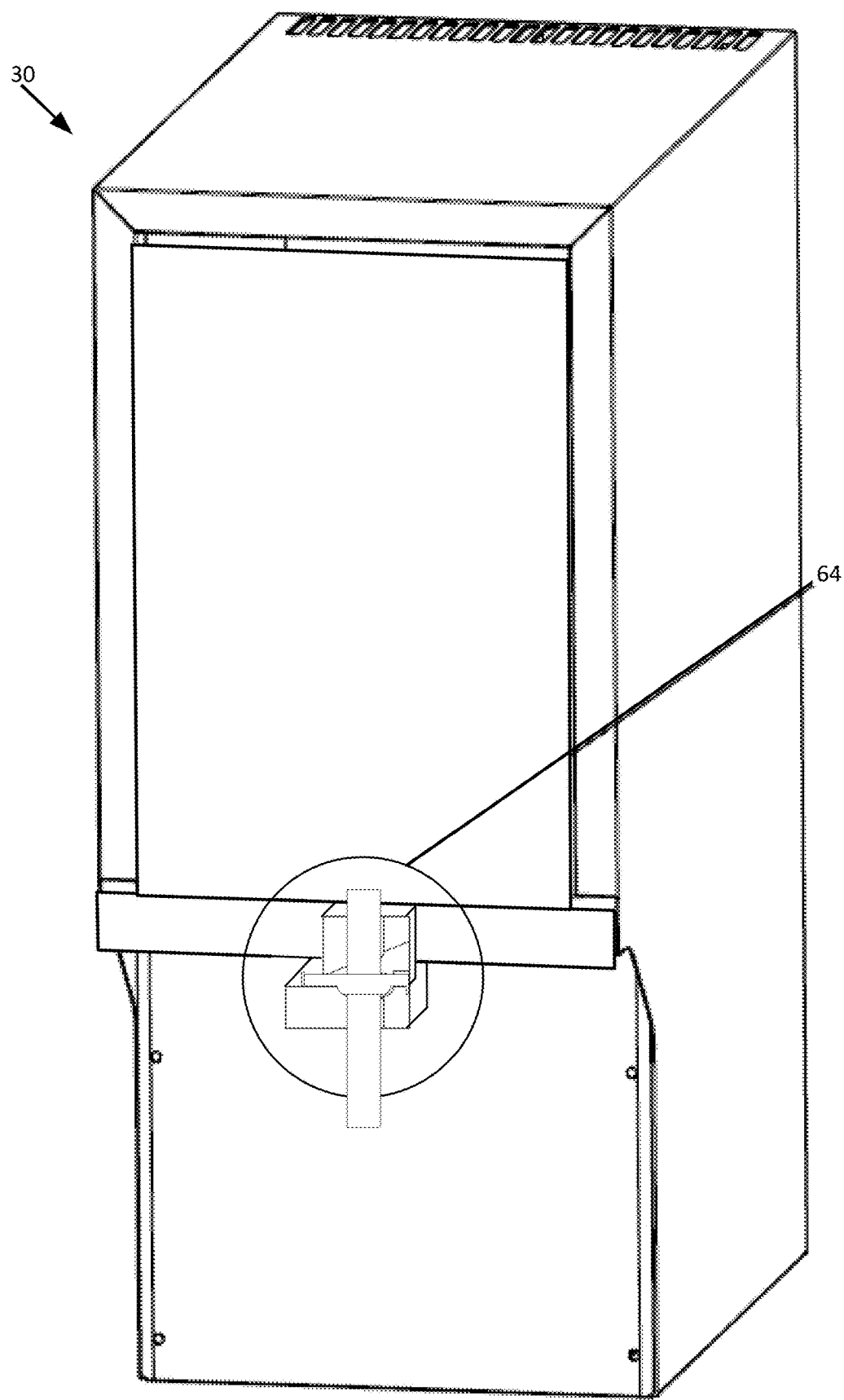
FIG. 1 shows a perspective view of a liquid-dispensing machine equipped with an embodiment of a pinch valve in accordance with the present disclosure.

FIG. 1 shows a front perspective view of a liquid-dispensing machine 30 equipped with a pinch valve 64 in accordance with the present disclosure. The liquid-dispensing machine 30 allows for metered dispensing of liquids such as, for example, milk and cream, into hot beverages such as, for example, tea and coffee.

Figure 2:
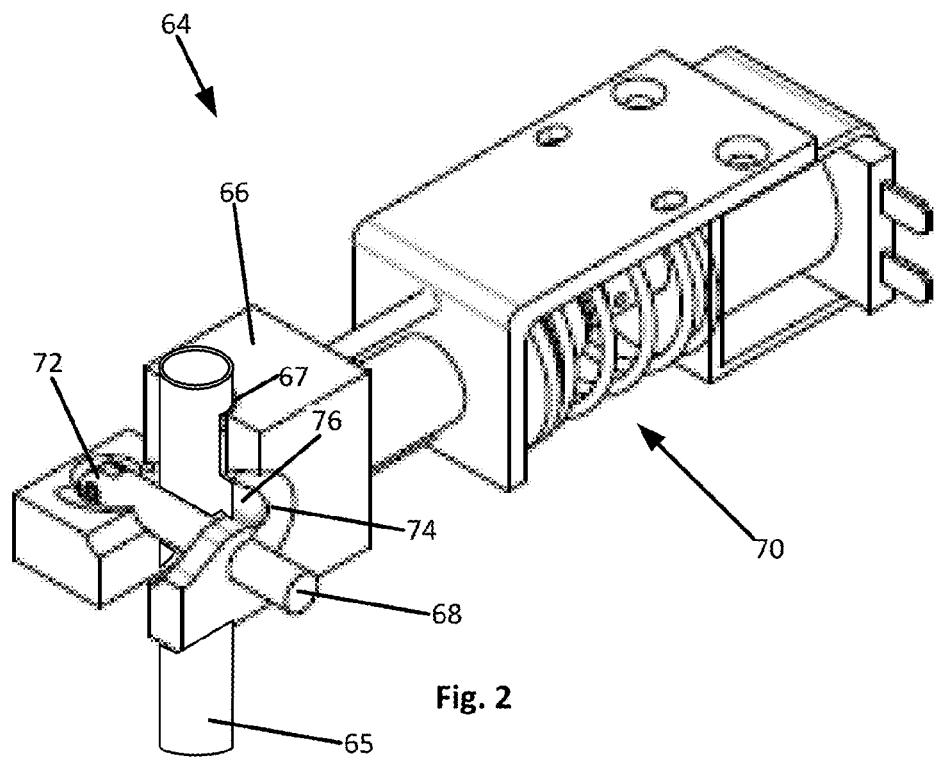
FIG. 2 shows a top front perspective view of the pinch valve shown in FIG. 1, in a closed position, with a dispensing tube installed in the pinch valve.

FIG. 2 shows the pinch valve 64, which is an embodiment of a pinch valve in accordance with the present disclosure. The pinch valve 64 is for receiving a dispensing tube 65 and for controlling a flow of liquid through the dispensing tube. FIG. 2 shows the pinch valve 64, which includes a housing portion 66, a pinch bar 68, and a solenoid plunger assembly 70. The housing portion 66 defines a recess 67 in which the dispensing tube 65 is positioned. That is, the recess 67 partially surrounds the dispensing tube 65. The pinch bar 68 is pivotally secured to the housing portion 66 through an articulated joint 72, which allows the pinch bar 68 to be moved about two rotation axes. The housing portion 66 defines a recess 74 that can receive and hold the pinch bar 68 in the installed position, as shown in FIG. 2. The recess 74 and the pinch bar 68 thus form a latch mechanism with the pinch bar being a striker and the recess 74 defining a keeper. When positioned in the recess 74, with the pinch bar 68 in the installed position, the dispensing tube 65 is pinched between the pinch bar 68 and the tip 76 of a plunger of the plunger assembly 70. The articulated joint 72 has two axes of rotation and in the present invention is removably secured to the housing portion 66.

Within the context of the present disclosure, the housing portion 66 and the pinch bar 68 can be said to form a pinch valve body.

Figure 3:
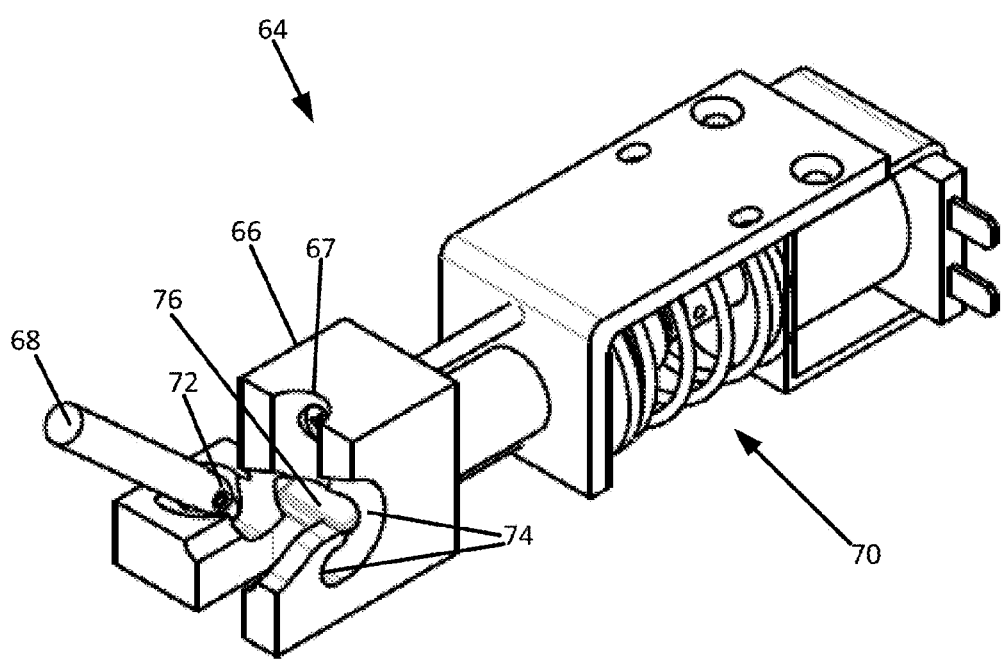
FIG. 3 shows the pinch valve of FIG. 2 in an open configuration where an articulated arm is in an open position.
Figure 4:
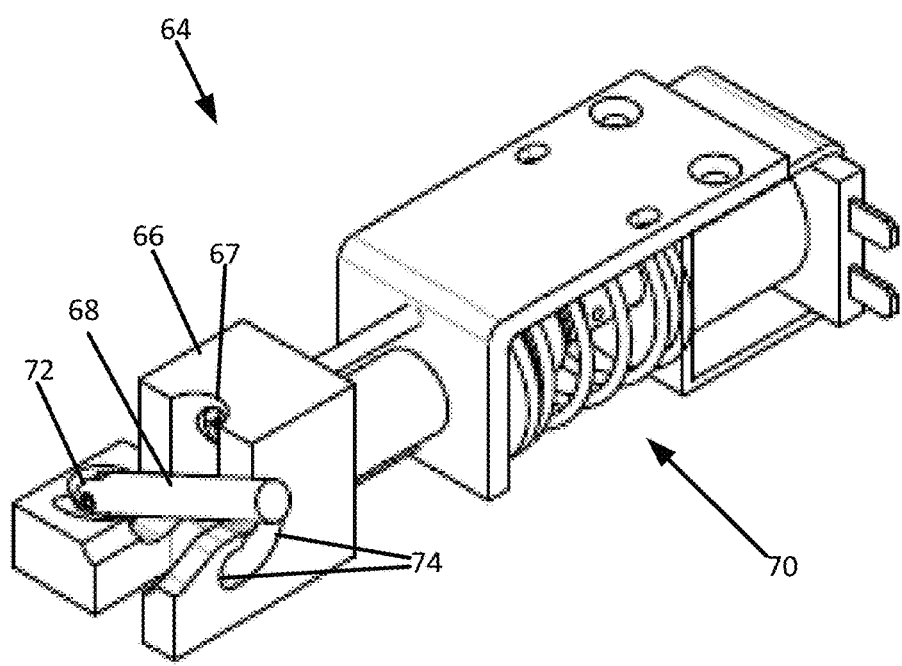
FIG. 4 shows the pinch valve of FIG. 2 with the articulated arm in an intermediary position.

FIG. 3 shows the pinch valve 64 with the pinch bar 68 in the open position and without a dispensing tube. FIG. 4 shows the pinch valve 64 with the pinch bar 68 in an intermediary position, which is between the open position of FIG. 3 and the installed position of FIG. 2.

Figure 5:
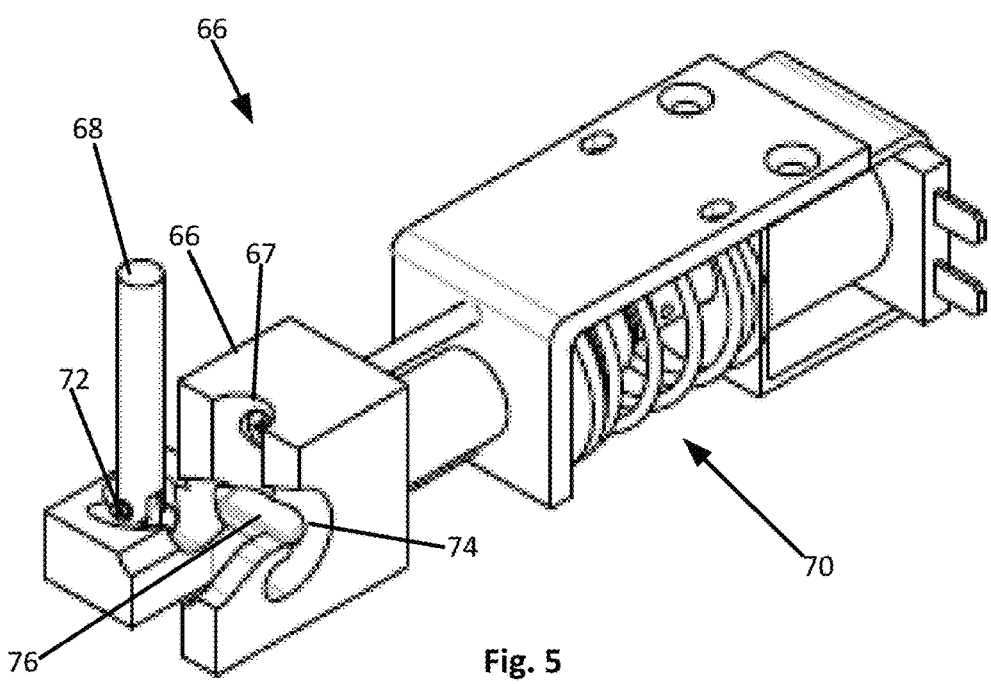
FIG. 5 shows the pinch valve of FIG. 2 with the articulated arm in a vertical position.
Figure 6A:
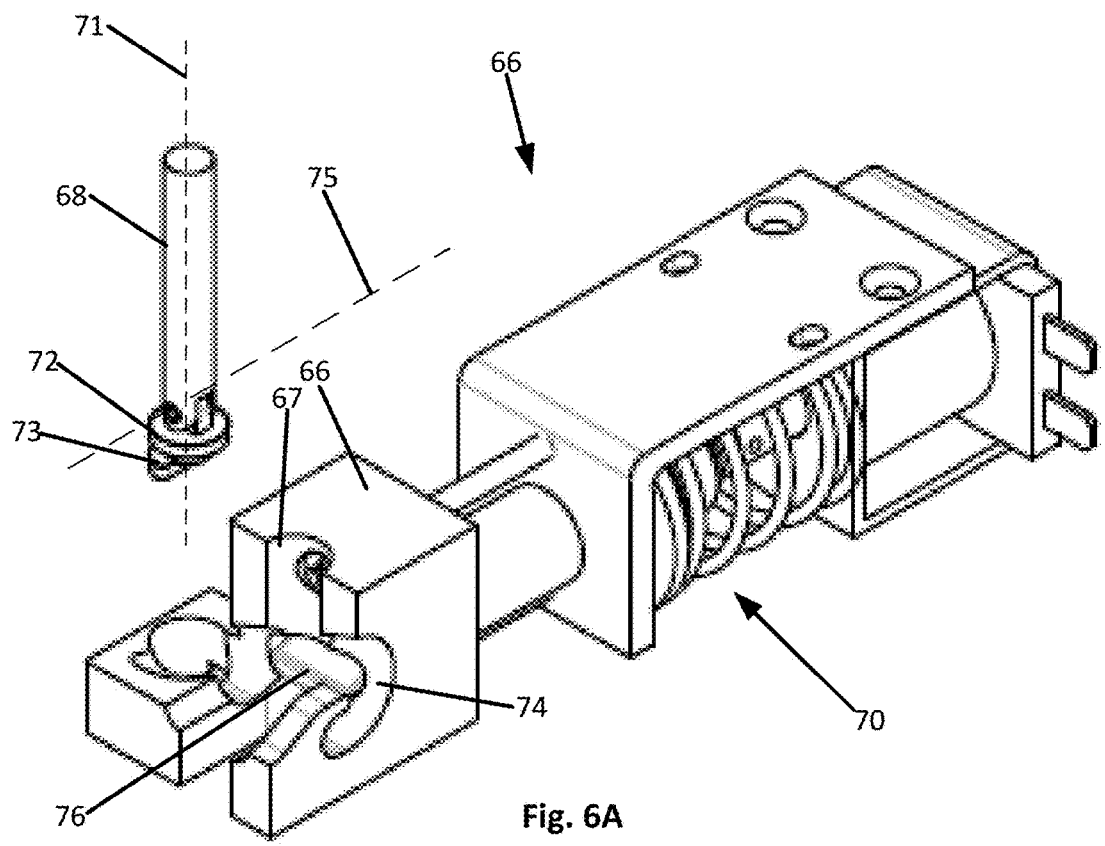
FIG. 6A shows the pinch valve of FIG. 2 with the articulated arm is removed.

FIG. 5 shows the pinch valve 66 with the pinch bar 68 in the vertical position from which it can be brought to a removed position as shown at FIG. 6A. FIG. 6A also shows the articulated joint 72 and the two rotation axes 71 and 75 about which the pinch bar 68 can rotate. In the present embodiment, the articulated joint 72 is a universal joint, which defines the rotation axes 71 and 75. As will be understood by the skilled worker, the articulated joint 72 need not be a universal joint. Any suitable type of articulated joint that allows movement of the pinch bar 68 from the installed position (shown at FIG. 2) to the open position (shown at FIG. 3) is to be considered within the scope of the present disclosure. Other examples of articulated joints are discussed further below.

Figure 6B:
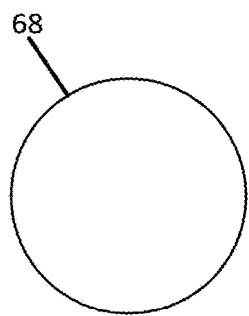
FIG. 6B shows a cross-section of a pinch bar in accordance with the present disclosure.
Figure 6C:
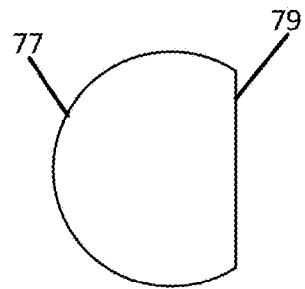
FIG. 6C shows a cross-section of another pinch bar in accordance with the present disclosure.

In the present embodiment, the pinch bar 68 has a circular cross-section, as shown at FIG. 6B. However, pinch bars with any suitable cross-section are to be considered within the scope of the present disclosure. For example, FIG. 6C shows a pinch bar 77 that has a partially circular cross-section with a flat surface 79. The pinch bar 77 is configured such that, when present in a pinch valve, in the installed position, the flat surface 79 is oriented to face the plunger in order to have the dispensing tube pinched between the plunger tip (76, FIGS. 6 and 7) and the flat surface 79. That is, the flat surface 79 is for receiving strikes from the plunger (plunger tip) and can be referred to as a striking surface.

Figure 7:
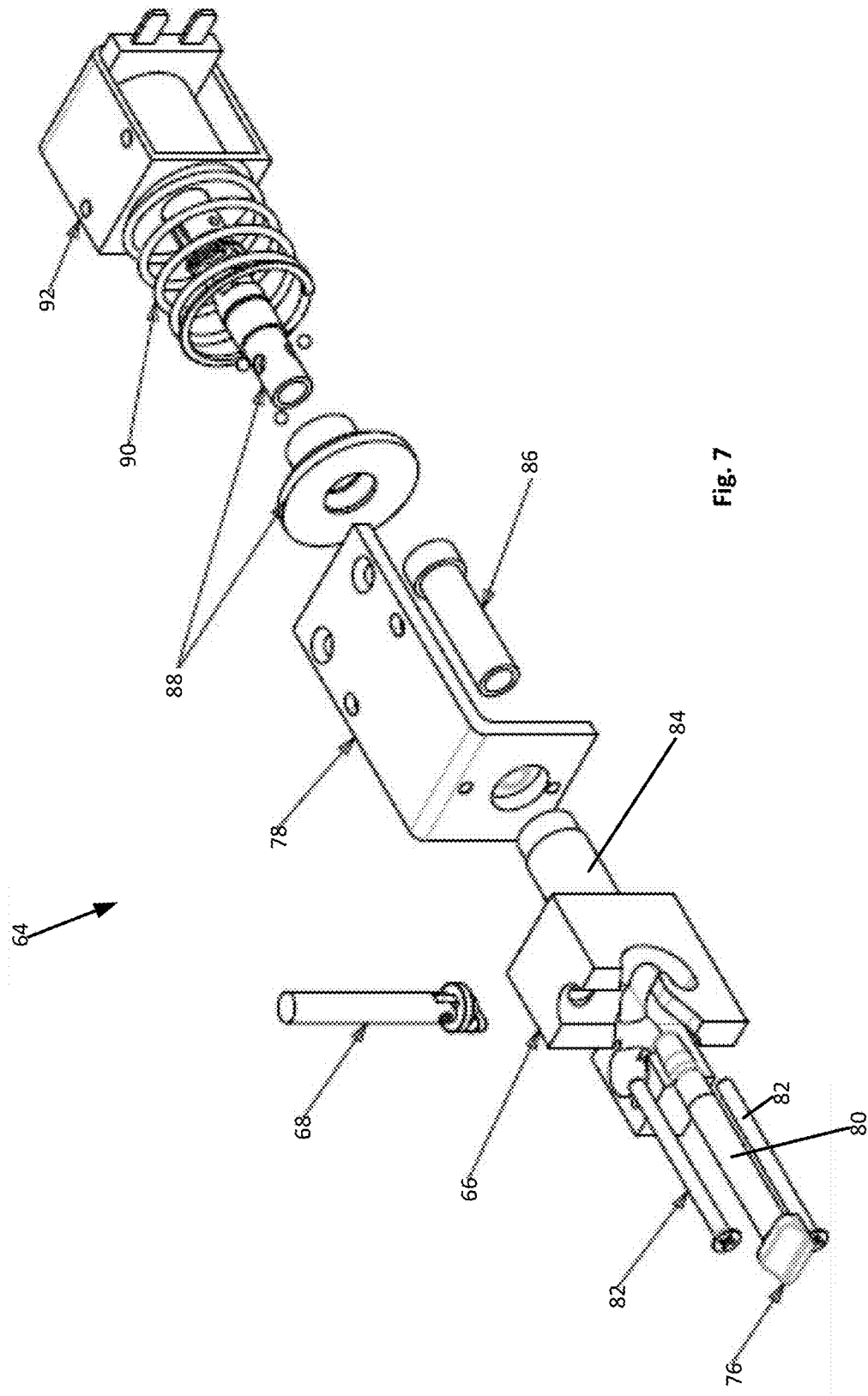
FIG. 7 shows an exploded view of the pinch valve of FIG. 8.

FIG. 7 shows an exploded view of the pinch valve 64. Shown in FIG. 7 are the housing portion 66, the pinch bar 68, and a bracket 78, which can be secured to a liquid-dispensing machine through any suitable means. FIG. 7 also shows a plunger 80, the plunger tip 76, and screws 82, which are used to secure the housing portion 66 to the bracket 78. FIG. 7 further shows a sleeve 84, a bushing 86, a quick-connect assembly 88, a spring 90, and a solenoid 92. As will be understood by the skilled worker, the pinch valve 64 allows a user to quickly remove a dispensing tube from the pinch valve, remove the associated spent liquid container, replace the spent liquid container with a new, full container, and install the dispensing tube of the new container in the pinch valve. As will also be understood by the skilled worker, the pinch valve 64 has a reduced number of parts, and offers easy cleaning without having to remove any part.

Additionally, the strength of the articulate bar 68 in the installed position offers a solid surface for the plunger to strike against.

FIG. 8 shows a top front perspective view of the housing portion 66 connected to the sleeve 84. FIG. 9 shows a side elevation view of the housing portion 66 connected to the sleeve 84. As shown at FIG. 8, a pass-through hole 94 formed in the housing portion 66. The pass-through hole 94 is for releasably holding the aforementioned pinch bar 68 in the housing portion 66. In order to be able to guide the pinch bar 68 from the installed position to the open position, the housing portion 66 defines, as shown at FIGS. 8 and 9, a guide surface 69 and the recess 74.

FIG. 10 shows a top view of the housing portion 66 connected to the sleeve 84. FIG. 10 also shows the dispensing tube installed in the hosing portion 66.

FIG. 11 a bottom view of the housing portion 66 connected to the sleeve 84.

FIG. 12A shows a front elevation view of the housing portion 66. FIG. 12B shows a front view of the housing portion 66 with the pinch bar 68 installed therein, in the closed configuration. The housing portion 66 defines a plunger aperture 91 through which the plunger 80 of FIG. 7 connects to the solenoid 92, also shown at FIG. 7. The housing portion 66 further defines a displacement path for the plunger 80 to move within the housing portion. That is, the housing portion 66 is configured to allow the plunger to be displaced within the housing portion 66. The displacement path is collinear with the plunger 80, as shown at FIG. 7.

FIG. 13 shows a back elevation view of the housing portion 66.

Figure 14:
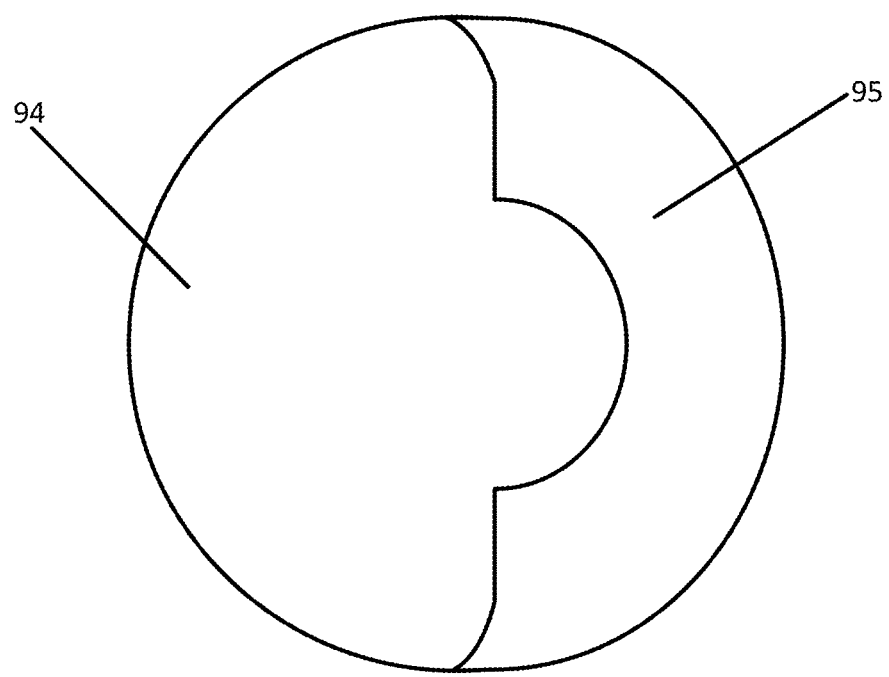
FIG. 14 shows a top view of a through hole defined in the housing portion of FIG. 8.
Figure 15:
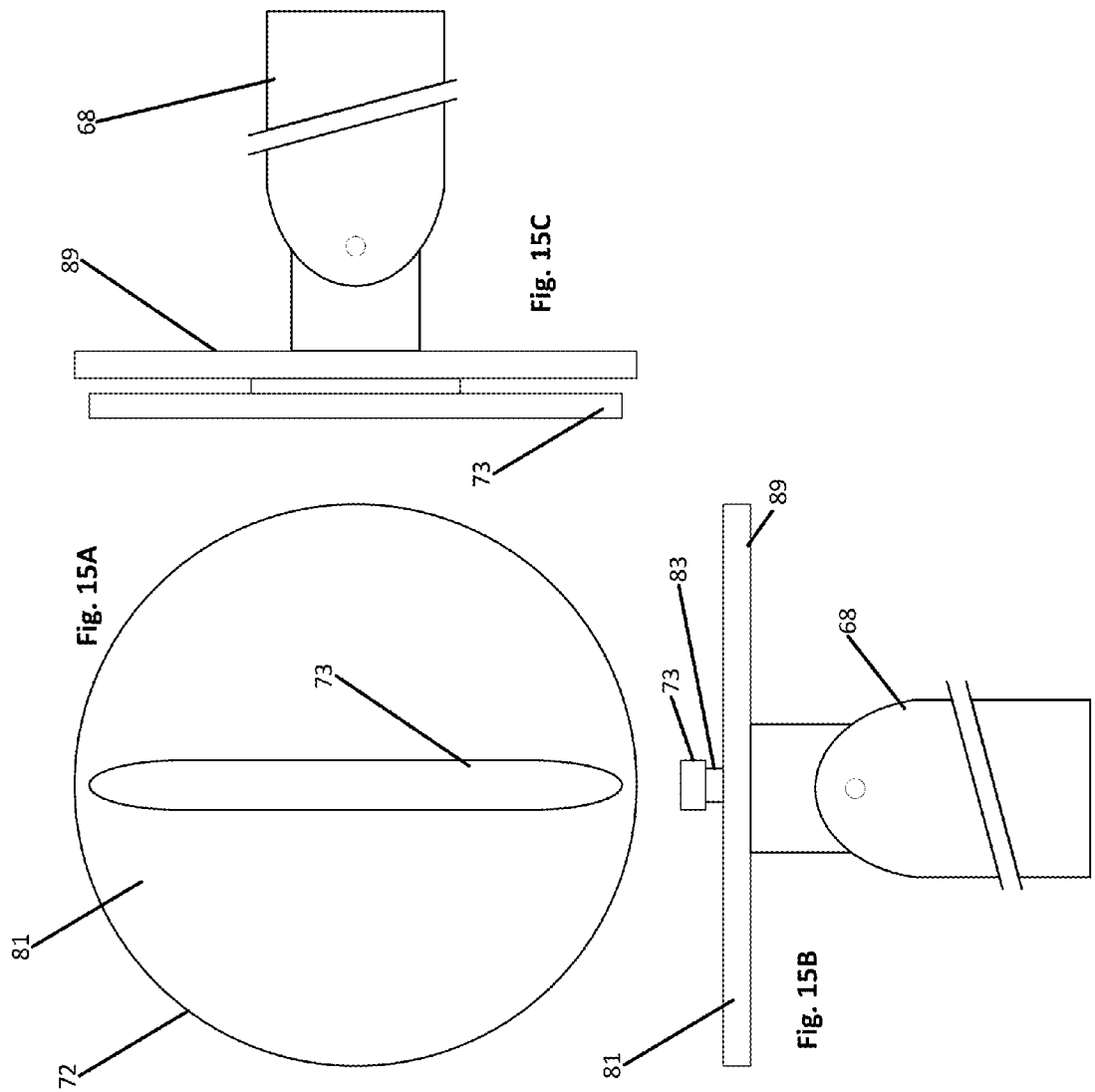
FIG. 15A shows a bottom view of an articulated joint of some embodiment of the present disclosure.
FIG. 15B shows an orthogonal view of the articulated joint of FIG. 15A.
FIG. 15C shows another orthogonal view of the articulated joint of FIG. 15A.

As stated above, the pass-through hole 94 is for connecting the housing portion 66 to the articulated joint 72 of the pinch bar 68. An isolated top view of the through-hole 94 is shows at FIG. 14. FIG. 15A shows a bottom view of the articulated joint 72. As shown in this figure, the articulated joint 72 includes a plate 81 and a retaining member 73, which is spaced apart from the plate 81. The pinch bar 68 is connected to the plate 81. FIG. 15B shows an orthogonal view of the articulated joint 72. FIG. 15C shows another orthogonal view of the articulated joint 72. As shown in these figures, the articulated joint 72 includes a retaining member 73 that is spaced apart from the plate 81 by a spacer 83 shown at FIG. 15B.

Figure 16:
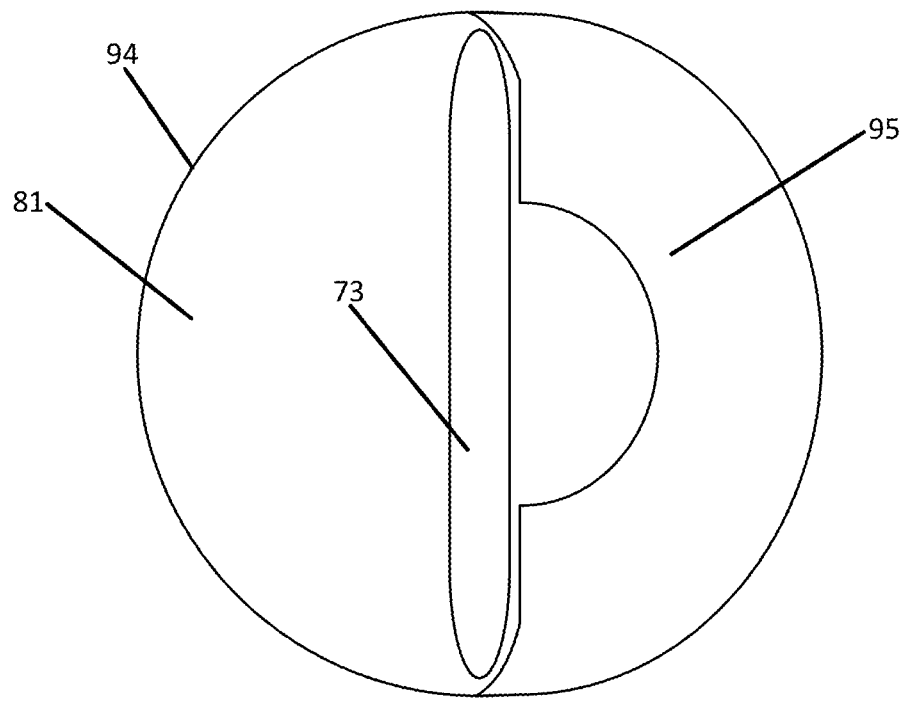
FIG. 16 shows a bottom view of the through hole of FIG. 14 with the retaining member and the plate of the articulated joint of FIG. 15A.
Figure 17:
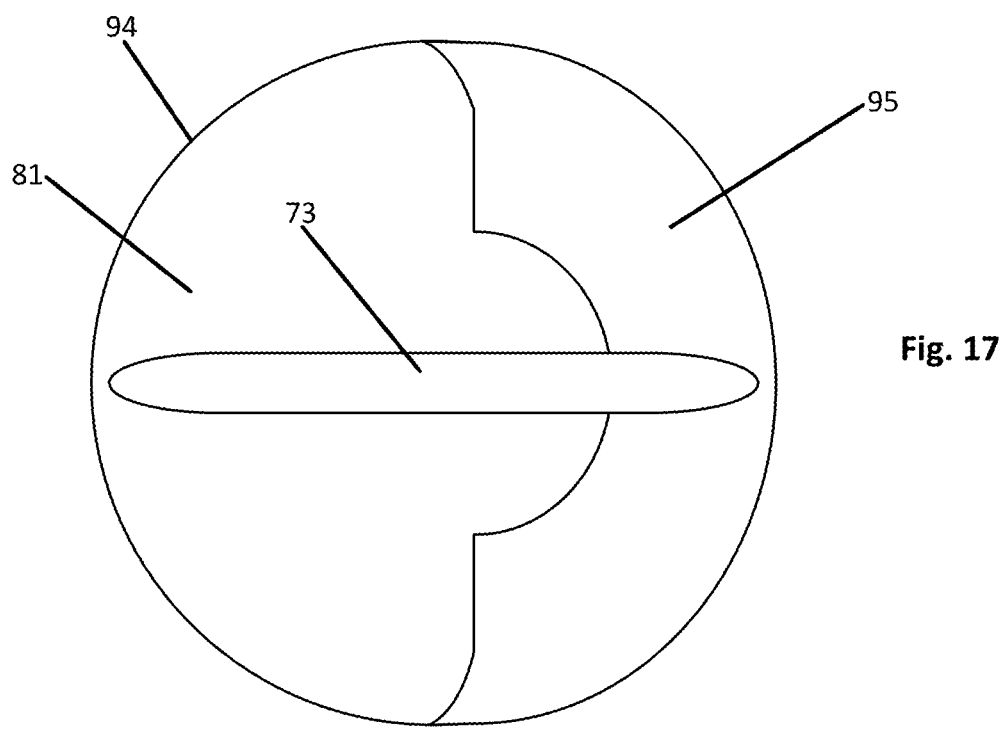
FIG. 17 shows a bottom view of the through hole of FIG. 14 with the retaining member and the plate of FIG. 16 rotated.

To connect the pinch bar 68 to the housing portion 66, the articulated joint 72 is inserted in the through hole 94, from the top of the housing portion 66. The retaining member 73 is inserted in the through hole 94, past the wall 95. FIG. 16 shows a bottom view of the through hole 94 with the retaining member 73 and the plate 81. Once the retaining member 73 is past the wall 95, the articulated joint 72 can be rotated to rotate the retaining member 73 in order to have the retaining member 73 interfere with the wall 95 upon the pinch bar 68 being pulled away from the housing portion 66. This interference between the retaining member 73 and the wall 95 removably secures the pinch bar 68 to the housing portion 66. FIG. 17 shows a bottom view of the through hole 94 with the articulated joint's retaining member 73 and the plate 81 rotate to have the retaining member interfere with the wall 95.

As will be understood by the skilled worker, any suitable means to secure the articulated joint 72 to the housing portion is to be considered as being within the scope of the present disclosure. For example, any suitable type of snap-fit connection that allows for connecting/disconnecting the pinch bar to the housing portion is within the scope of the present disclosure. Further, any type of fastening mechanism that allows for connecting/disconnecting the pinch bar to the housing portion is also within the scope of the present disclosure.

The housing portion 66 and the pinch bar 68 can be made of any suitable material such as, for example, acetal, high-density polyethylene, aluminum etc. In some embodiments, the housing portion 66 and pinch bar 68 can be located inside a refrigerated space and, referring now to FIG. 7, the bracket 78 and the solenoid 92 can be located outside the refrigerated space in question. In this example, a partition separates the refrigerated space from the space in which the bracket 78 and the solenoid 92 are located. The partition defines an opening to accommodate a plunger assembly operationally connected to the solenoid 92 and extending through the partition and into the housing portion 66.

Figure 18:
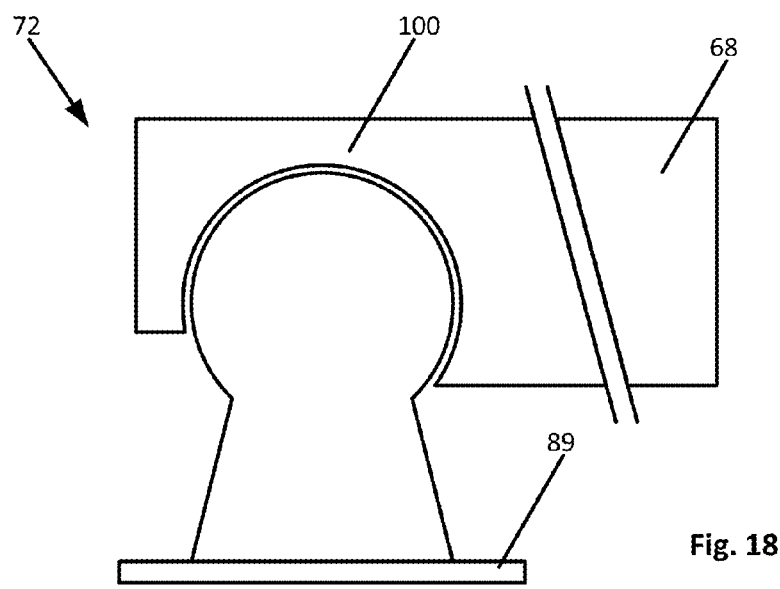
FIG. 18 shows a cross-sectional view of a ball and socket joint to which is connected a pinch bar in accordance with the present disclosure.
Figures 19A, 19B:
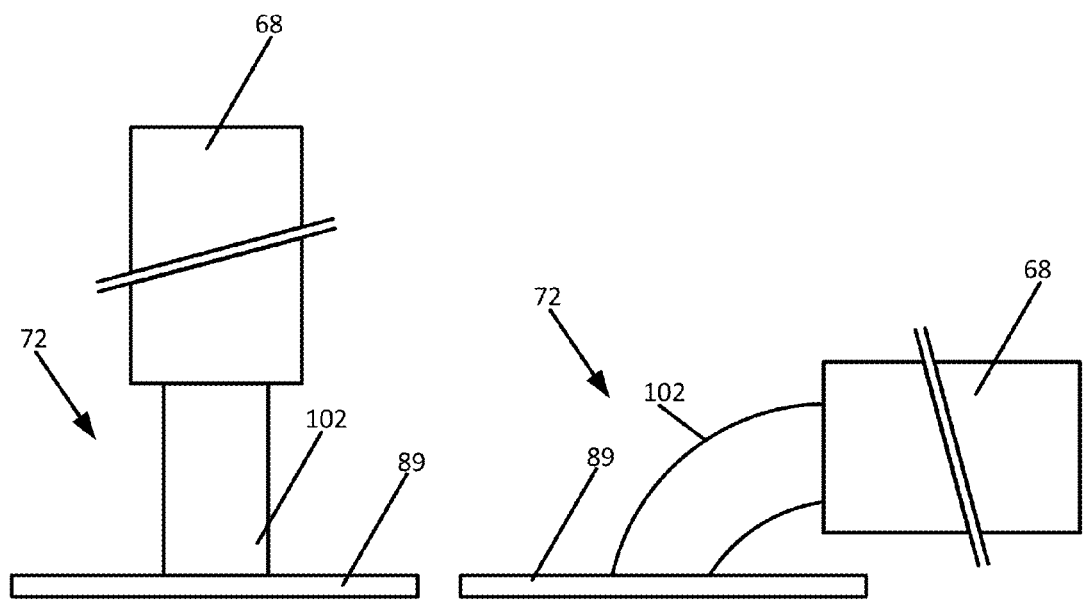
FIG. 19A shows a flexure joint to which is connected a pinch bar in accordance with the present disclosure.
FIG. 19B shows the flexure joint of FIG. 19A in a bend state.

As stated above, the articulated joint 72 does not need to be a universal joint. For example, ball and socket joints, flexure joints made of flexible (bendable) material can be used as that articulated joint 72 without departing from the scope of the present disclosure. FIG. 18 shows an cross-sectional view of an example of an articulated joint 72 in the form of a ball and socket joint 100 to which is connected the pinch bar 68. The ball and socket joint is connected to the plate 89, which can be secured to the housing portion through any suitable means. The ball and socket joint 100 can be rotated in any direction (and thus has at least two rotation axes). FIG. 19A shows a flexure joint 102, which is another example of an articulated joint 72, to which is connected the pinch bar 68. The flexure joint 102 can be bent in any direction (and thus has at least two rotation axes) and can be made of any suitable flexible material such as an elastomer material. The flexure joint 102 is shown connected to the plate 89, which can be secured to the housing portion through any suitable means. FIG. 19B shows the flexure joint 100 in a bent state (configuration).

Plunger assemblies of various types can be used in the pinch valve without departing from the scope of the present disclosure. For example, a solenoid-activated plunger assembly, a manually activated plunger assembly, stepper motor plunger assembly, or any other suitable electro-mechanical plunger assembly can be used.

Advantageously, the pinch valve of the present disclosure has a pinch bar that can pivot from the closed configuration of the pinch valve to the open configuration of the pinch valve. In both configurations, the pinch bar sits below the top of the housing portion of the pinch valve. This greatly reduces the risk of damage to the pinch valve in that the likelihood of the door of the liquid dispenser unit interfering with the pinch bar when the pinch valve is in the open configuration is essentially nil. Further, the likelihood of the bag of liquid to be dispensed interfering with the closure when inserting the bag into the liquid dispenser unit is also greatly reduced.

Additionally, the pinch valve of the present disclosure can be configured to be retrofitted, in the field, to existing liquid-dispensing machines.

Further, the pinch valve of the present disclosure does not require any tool for servicing or cleaning and, can be opened/closed with one hand.

Furthermore, there is no need to fasten/unfasten fasteners to close/open the pinch valve of the present disclosure.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A pinch valve body for mounting to a liquid-dispensing unit and for cooperating with a plunger, the pinch valve body comprising:
    a housing portion defining a displacement path for the plunger to move within the housing portion;
    a pinch bar;
    an articulated joint having two axes of rotation, the articulated joint being connected to the housing portion, the pinch bar being attached to the housing portion through the articulated joint, the housing portion, the pinch bar and the articulated joint configured for movement of the pinch bar between a pinch position, where the pinch bar is in the displacement path, to an open position, where the pinch bar is out of the displacement path.

2. The pinch valve body of claim 1 wherein the articulated joint is a universal joint.

3. The pinch valve body of claim 1 wherein the articulated joint is a ball-in-socket joint.

4. The pinch valve body of claim 1 wherein the articulated joint is a flexure joint.

5. The pinch valve body of claim 4 wherein the flexure joint includes an elastomer material.

6. The pinch valve body of claim 1 wherein the housing portion includes a keeper configured to hold the pinch bar when the pinch bar is in the pinch position.

7. The pinch valve body of claim 6 wherein the keeper is defined by a recess in the housing portion.

8. The pinch valve body of claim 1 wherein the housing portion defines a recess to surround a dispensing tube installed in the pinch valve body.

9. The pinch valve body of claim 1 wherein the pinch bar has a circular cross-section.

10. The pinch valve body of claim 1 wherein the pinch bar defines a flat surface for receiving strikes from the plunger.

11. A pinch valve body for mounting to a liquid-dispensing unit and for cooperating with a plunger, the pinch valve body comprising:
    a housing portion;
    a pinch bar;
    an articulated joint having two axes of rotation, the articulated joint being connected to the housing portion, the pinch bar attached to the housing portion through the articulated joint, the housing portion, the pinch bar and the articulated joint configured for movement of the pinch bar between a pinch position, where the pinch bar is set to receive strikes from the plunger, to an open position.

12. The pinch valve body of claim 11 wherein the articulated joint is a universal joint.

13. The pinch valve body of claim 11 wherein the articulated joint is a ball-in-socket joint.

14. The pinch valve body of claim 11 wherein the articulated joint is a flexure joint.

15. The pinch valve body of claim 14 wherein the flexure joint includes an elastomer material.

16. The pinch valve body of claim 11 wherein the housing portion includes a keeper configured to hold the pinch bar when the pinch bar is in the pinch position.

17. The pinch valve body of claim 16 wherein the keeper is defined by a recess in the housing portion.

18. The pinch valve body of claim 11 wherein the housing portion defines a recess to surround a dispensing tube installed in the pinch valve body.

19. The pinch valve body of claim 11 wherein the pinch bar has a circular cross-section.

20. The pinch valve body of claim 11 wherein the pinch bar defines a flat surface for receiving strikes from the plunger.

* * * * *